United States Patent [19]
Allen

[11] 3,902,359
[45] Sept. 2, 1975

[54] TON CYCLE INDICATOR

[75] Inventor: Theodore M. Allen, Oakland, Calif.

[73] Assignee: The Rucker Company, Oakland, Calif.

[22] Filed: Dec. 14, 1973

[21] Appl. No.: 424,877

[52] U.S. Cl. .................................. 73/133 R; 73/158
[51] Int. Cl.² .......................................... G01L 3/00
[58] Field of Search ............ 73/133 R, 143, 144, 91, 73/158; 177/147, DIG. 3

[56] References Cited
UNITED STATES PATENTS

| | | | |
|---|---|---|---|
| 2,646,273 | 7/1953 | Wetsel | 177/147 |
| 2,765,654 | 10/1956 | Greer et al. | 177/147 X |
| 3,295,364 | 1/1967 | Van Dyke | 73/67.3 X |
| 3,382,713 | 5/1968 | Chutter | 73/158 X |
| 3,733,424 | 5/1973 | Pitts et al. | 73/67.3 X |
| 3,744,300 | 7/1973 | Fleury | 73/67.3 |

FOREIGN PATENTS OR APPLICATIONS 731,318  3/1966  Canada ..................... 177/DIG. 3

*Primary Examiner*—Charles A. Ruehl
*Attorney, Agent, or Firm*—Lothrop & West

[57] ABSTRACT

A ton cycle indicator for use with a repetitively tensioned cable includes a hydraulic chamber of variable volume connected into a loop in the cable to provide hydraulic pressure changes in accordance with changes in cable tension. Changing hydraulic pressure is translated electronically into a series of signals varying in number with the value of the changing pressure. The signals are accumulated in a register to indicate the number of times the cable tension is changed and the value of the pressure for each change.

7 Claims, 2 Drawing Figures

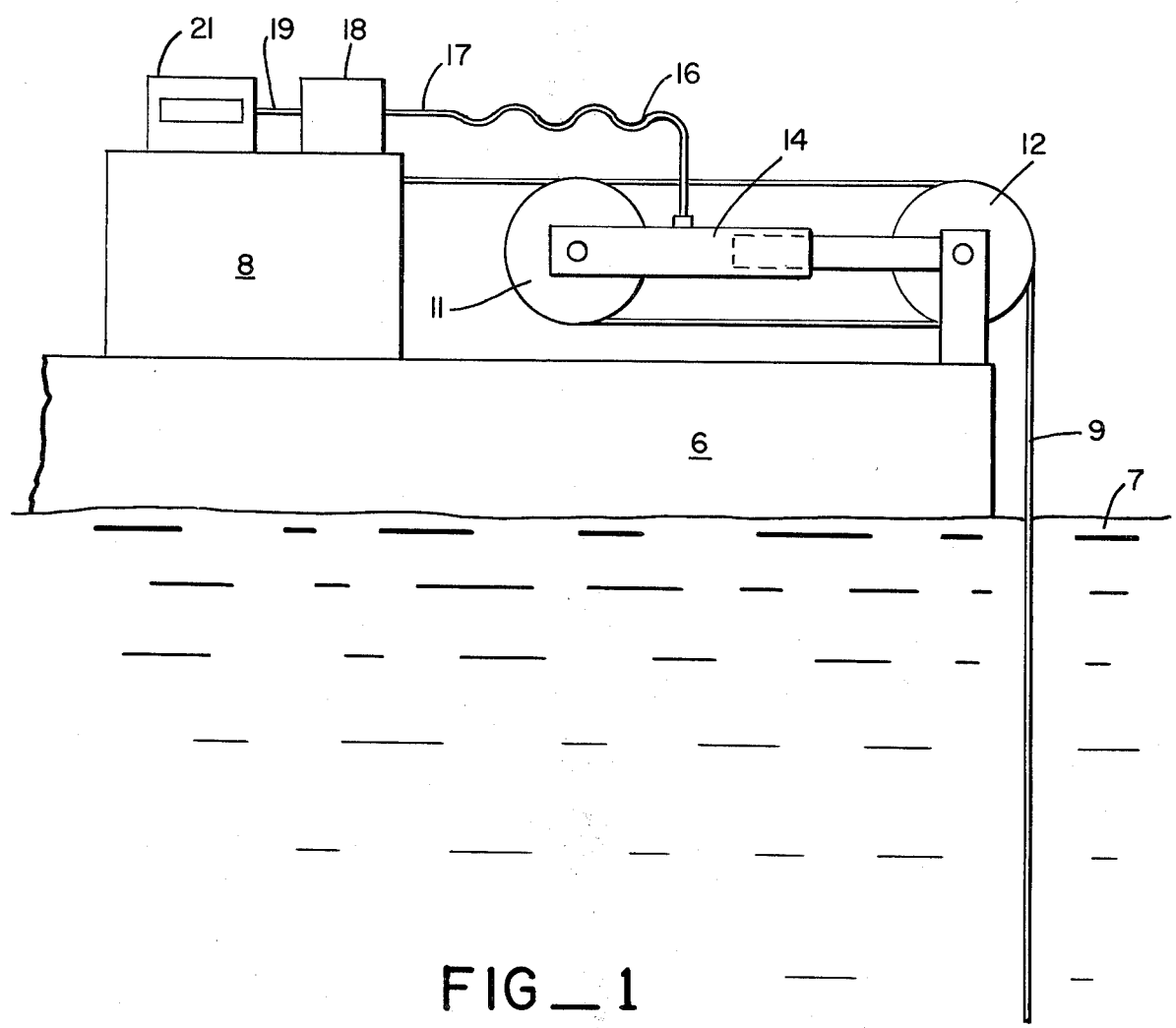
FIG_1

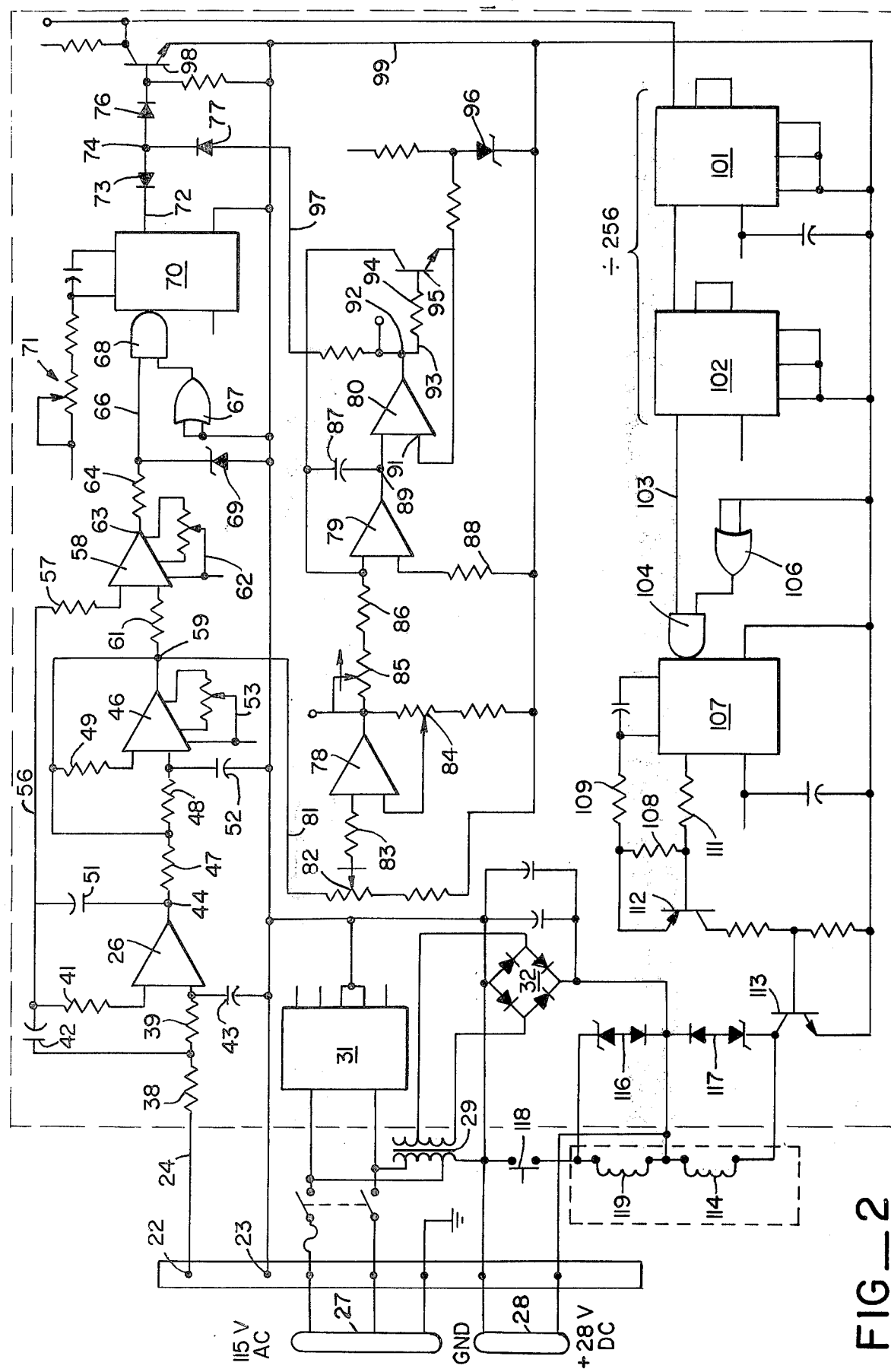
FIG_2

TON CYCLE INDICATOR

Many mechanisms utilize cables to assume and release loads repetitively during their working life. It has been determined that the effective life of the cable is a function not only of the amount of load that is put upon it but also of the number of times that the load is put upon and released from the cable or the number of times the cable is bent, as in the case of a cable riding over a sheave. Thus the two factors, the amount of the load and the number of times the load is put on and taken off, when considered together, afford an indication of the wear upon the cable and of the remaining expected life of the cable. If it were possible to read the number of times load is imposed upon a cable and the amount of the load imposed each time, then it would be possible to know the amount of the apparent useful life of the cable that has already been expended. With this knowledge it would be possible to renew cables in advance, for example, in order to avoid the very serious effects of breakage in the field or on the job.

There are many instances in which it is necessary to know the working conditions under which a cable, such as a flexible wire rope, is operating so that the cable can be replaced near the end of its useful life.

It is therefore an object of the invention to provide an indicator which will show both the intermittent load on the cable, expressed in tons, and the number of times load is imposed upon and removed from the cable, expressed in cycles.

Another object of the invention is to provide a ton cycle indicator.

A further object of the invention is to provide a ton cycle indicator that is quite simple and straightforward and is effective accurately to produce an output commensurate with the ton cycle input so that the meter operated by the output can afford true indications.

Another object of the invention is to provide a ton cycle meter that can be supplied together with cable equipment and that is rugged enough to operate under all of the ambient conditions in which the cable equipment can operate.

Other objects of the invention together with the foregoing are attained in the embodiment of the invention described in the accompanying description and illustrated in the accompanying drawings, in which:

FIG. 1 is an elevation in diagrammatic form of a vessel utilizing a cable mechanism subject to intermittent load and effective to transmit a signal from the variably loaded cable to a ton cycle indicator pursuant to the present invention; and FIG. 2 is a wiring or block diagram illustrating electronic circuitry useful in the ton cycle indicator of FIG. 1.

In an exemplary embodiment, the ton cycle indicator of the invention is utilized in connection with a vessel 6 floating in the ocean 7 and provided with cable operating structure in a housing 8. The operating structure controls a cable 9 by taking it in and paying it out. The load on the cable varies due to such action and also due to other, usually random factors so that the load varies widely and at random times. The cable itself is wrapped around or engaged with a pair of relatively movable pulleys 11 and 12 joined by a variable hydraulic chamber 14 as an interconnection. When the pulleys are made to approach each other by tension in the cable, hydraulic fluid is squeezed out of the chamber 14, whereas when the pulleys 11 and 12 part from each other by relaxation of the cable then hydraulic fluid returns to the chamber 14. The hydraulic pressure varies accordingly.

The pressure variations in the chamber 14 are communicated through a flexible line 16 and a pipe 17 to a ton cycle mechanism 18 principally containing circuitry as shown in FIG. 2 but also having a connection 19 extending to an indicator 21. This can be, for example, a digital indicator which is graduated in ton cycles and affords a composite reading based on the number of tons measured as pulling on the rope 9 and also the number of times that the tension in the rope has been raised from a selected, nominal value to a substantial value. The net result of observing both the time to time value of the load in tons and the operation of the cable during set increases in load over an arbitrary interval of time affords a total ton cycle reading. The accumulated ton cycles as shown by the indicator 21 are effective to warn the operator when the cable has had sufficient flexing and loading at least theoretically to be worn and to need replacement.

Pursuant to the arrangement, the pressure within the pipe 17 is transmitted to any standard form of pressure transducer (not shown) that converts the incoming hydraulic pressure fluctuations into corresponding outgoing electrical signals.

As particularly shown in FIG. 2, the electrical signals so generated are transmitted to terminals 22 and 23 of electronic circuitry. The translated, incoming signals are manifested as voltage differences between the terminals 22 and 23 and amount to an analog of the ton force on the hydraulic mechanism 14. Such a signal occurs once for each change in pressure within the mechanism 14 and the voltage difference corresponds to the amount of the pressure change. The signal can be considered to travel through a conductor 24 into a first conditioning amplifier 26.

The amplifier 26 and other parts of the electrical circuitry are suitably supplied with energy from a source 27 and from a source 28 both effective through an appropriate transformer 29 and appropriate power supplies 31 and 32 of generally standard forms to supply the working energy for the mechanism.

The amplifier 26 is effective with its associated components, such as resistors 38, 39 and 41, as well as capacitors 42 and 43, to remove the frequency components in the incoming signal above approximately 1 Hz but is effective, while removing such components, to transmit direct current and alternating components below 1 Hz. Consequently, the signal at the output 44 of the amplifier 26 is carried to a second conditioning amplifier 46 having associated components such as resistors 47, 48 and 49, as well as capacitors 51 and 52, and likewise having an adjusting or setting network 53. The function or effect of the sound conditioning amplifier 46 is to remove frequency components of the signal above 0.01 Hz while transmitting direct current along with frequency components of the incoming signal below 0.01 Hz. The output of the first amplifier 26 is connected through a conductor 56 and a resistor 57 to a third conditioning amplifier 58, while the signal at the output 59 of the amplifier 46 is similarly conducted through a resistor 61 to another terminal of the third amplifier 58. This amplifier likewise has an adjusting network 62.

The amplifiers 26 and 46 are considered as active filters of the low pass type and both send their output signals into the amplifier 58 acting as a differential amplifier. From the amplifier 58 there is an output from the terminal 63 thereof through a resistor 64, the output reflecting difference in amplitude between the output signal from the amplifier 26 and the output signal from the amplifier 46. The output of the differential amplifier 58; i.e., the amplitude difference resulting from the operation of the preceding amplifiers, is non-zero for only those frequencies transmitted by the amplifier 26 and not transmitted by the amplifier 46. The voltage at the terminal 63 of the amplifier 58 is non-zero only if there is a change in the signal input voltage occurring at a rate between about one cycle per minute and one cycle per second. Thus the variations in load on the cable are detected within this range of frequencies.

Since the differential amplifier 58 is an amplifier of a high gain configuration, its own output at the terminal 63 will be either zero or will be several volts, depending upon the relative amplitude of the amplifier 26 output with respect to the amplifier 46 output. When the output at the terminal 63 from the amplifier 58 changes from zero to a positive voltage, then a signal is sent through the resistor 64 and a conductor 66 and through appropriate gating structures 67 and 68. A zener diode 69 acts as a voltage limiter to keep the voltage at the resistor 64 from overloading the gate 68. The gated signal is impressed on a one-shot multivibrator 70 having its own attendant resistance and capacitative adjustable network 71. This network 71 is variable to set the duration of the output pulse from the multivibrator 70. When so energized the multivibrator is triggered and produces a one hundred millisecond positive pulse. Such pulse travels over a conductor 72 and reverses or back biases a diode 73 connected to a common junction 74 with diodes 76 and 77. This allows the common junction 74 to follow any positive voltage excursions that are applied to the diode 77.

Positive voltage excursions applied to the diode 77 are those positive pulses generated by a voltage-to-frequency converter composed of a calibrating amplifier 78 and amplifiers 79 and 80 with their attendant interconnections acting in cascade.

In operation, the output of the amplifier 46 at the point 59 (which contains only the direct current and very low frequency components of the input signal) is applied to the amplifier 78 through a conductor 81, an adjustable resistor 82 and a fixed resistor 83. The signal to the proportioning amplifier 78, having a gain adjuster 84 then is in a suitable voltage range to supply current through a variable resistor 85 and a fixed resistor 86 to an integrator system including the amplifier 79, an attendant capacitor 87 and a resistor 88.

In turn, the output of the amplifier 79 is a voltage that is ramped with respect to time; that is, a voltage that increases at a predetermined rate over a known time interval. The ramping rate is proportional to the output voltage of the amplifier 78. When the voltage output of the amplifier 79 at the connection 89 is the same as the voltage level at the connection 91 of the amplifier, then through an output terminal 92 a conductor 93 with a resistor 94 therein is effective to turn on a transistor 95 connected to ground through a zener diode voltage regulator 96. This has the effect of discharging the capacitor 87, thus resetting the integrator, including the amplifier 79 and its adjuncts, as previously described. The integrator then begins a voltage ramp again.

The amplifier 80 operates in a high gain mode as a threshold detector so its output is either at a negative or positive voltage extreme and so produces well-defined pulses at a rate proportional to the voltage level at the input to the amplifier 78.

The train of pulses so produced by the voltage-to-frequency converter is applied through a conductor 97 to a transistor 98 to furnish a corresponding output through a conductor 99 to count-down mechanisms 101 and 102 having the effect of dividing the received pulses by 256, in this instance. There is thus furnished a correspondingly diminished output through a conductor 103 and controlled by suitable gates 104 and 106 to a pulse generator 107 having appropriate auxiliary mechanisms including a resistor 108 to control the duration of output pulses from the pulse generator and resistors 109 and 111 to control the voltage applied to and the current going into an amplifier transistor 112. This is effective through another amplifier transistor 113 to energize an event counter 114. Diode pairs 116 and 117 are provided to dissipate voltage spikes due to switching of the transistor 113. Energy is applied to the counter 114 only for the one hundred milliseconds after any increase in the input signal voltage sufficient to trigger the multivibrator 70. In this way the counter affords an indication of the number of actuating pulses representing the amount of tension in each cycle and the number of times the tension has changed thus giving a ton cycle indication. There is a manual switch 118 operating a reset coil 119 to restore the counter to zero at any time at the option of the user.

What is claimed is:

1. A ton cycle indicator for use with a repetitively tensioned cable comprising:
    a. transducer means responsive to the amount of cable tension for providing signals having a magnitude varying in accordance with the amount of cable tension,
    b. cascaded filter means for receiving said signals and supplying first and second filtered signals,
    c. circuit means for receiving said second filtered signals and supplying pulses varying in number in accordance with the magnitude of said second filtered signals,
    d. means for receiving and accumulating said pulses over repeated tensionings of said cable,
    e. comparison means for detecting the difference between said first and second filtered signals, and
    f. gate means responsive to said comparison means for gating said pulses to said receiving and accumulating means for a predetermined time interval each time said comparison means detects a difference between said first and second filtered signals.

2. A ton cycle indicator as recited in claim 1 wherein said filter means comprises low pass filters.

3. A ton cycle indicator as recited in claim 1 wherein said receiving and accumulating means comprises a counter.

4. A ton cycle indicator as recited in claim 1 wherein said indicator further comprises means for reducing the number of said pulses by a fixed factor prior to accumulating said pulses.

5. A ton cycle indicator as recited in claim 1 wherein said transducer means comprises a variable volume chamber having two relatively movable parts with hydraulic fluid therebetween and a cable pulley on each of said parts adapted to engage a loop in said cable and to vary the pressure on said fluid in accordance with the tension in said cable.

6. A ton cycle indicator as recited in claim 1 wherein said gating means gates said pulses for a short period of time relative to the time between cycles of tensioning of said cable.

7. A ton cycle indicator as recited in claim 1 wherein said circuit means for receiving said second filtered signals and supplying pulses comprises voltage to frequency conversion means.

* * * * *